(12) United States Patent
Wakefield, II et al.

(10) Patent No.: US 6,819,981 B2
(45) Date of Patent: Nov. 16, 2004

(54) METHOD AND APPARATUS FOR SETTING SPEED/RESPONSE PERFORMANCE PARAMETERS OF A POWER DRIVEN WHEELCHAIR

(75) Inventors: Theodore D. Wakefield, II, Vermillion, OH (US); Julie A. Jacono, Rocky River, OH (US)

(73) Assignee: Invacare Corporation, Elyria, OH (US)

( * ) Notice: Subject to any disclaimer, the term of this patent is extended or adjusted under 35 U.S.C. 154(b) by 3 days.

(21) Appl. No.: 10/419,396

(22) Filed: Apr. 21, 2003

(65) Prior Publication Data

US 2004/0210351 A1 Oct. 21, 2004

(51) Int. Cl.$^7$ .............................................. G06F 19/00
(52) U.S. Cl. ......................................................... 701/1
(58) Field of Search .............................. 701/1, 36, 58, 701/59; 180/272, 271, 907

(56) References Cited

U.S. PATENT DOCUMENTS 5,033,000 A * 7/1991 Littlejohn et al. ............ 701/36

OTHER PUBLICATIONS

Kamihira (US 2002/0023062 A1).*

* cited by examiner

Primary Examiner—Thu V. Nguyen
(74) Attorney, Agent, or Firm—Nenad Pejic; Calfee, Halter & Griswold LLP

(57) ABSTRACT

A method of setting values of a multiplicity of performance parameters of a power driven wheelchair into a controller thereof comprises the steps of: grouping the multiplicity of performance parameters into at least two groups; for each group, (a) establishing a corresponding relationship between a selected performance parameter and each of the other performance parameters; and (b) presetting the established relationships into the controller; determining a value for each selected performance parameter based on the user's capabilities of operating the wheelchair; entering the determined value for each selected performance parameter into the controller; deriving automatically by the controller for each group a value for each of the other performance parameters based on the entered value of the selected performance parameter and the corresponding established relationships of each of the other performance parameters with the selected performance parameter; and storing the entered and derived values of the performance parameters into the controller.

16 Claims, 5 Drawing Sheets

(BACKGROUND)

SPEED

| Forward | Turning | Reverse |
|---|---|---|
| 95 | 20 | 35 |
| 75 | 17 | 30 |
| 55 | 15 | 25 |
| 35 | 10 | 20 |
| 15 | 10 | 10 |

FIG. 2

RESPONSE

| Turning Speed | Fwd. Accel. | T. Accel. | T. Decel. | Torque | Braking |
|---|---|---|---|---|---|
| 1.3 X | 20 | 55 | 55 | 25 | 60 |
| 1.3 X | 10 | 50 | 50 | 10 | 55 |
| 1.0 X | 7 | 45 | 45 | 5 | 50 |
| 0.60 X | 2 | 40 | 40 | 2 | 45 |
| 0.60 X | 0 | 35 | 35 | 1 | 40 |

FIG. 3

METHOD AND APPARATUS FOR SETTING SPEED/RESPONSE PERFORMANCE PARAMETERS OF A POWER DRIVEN WHEELCHAIR

BACKGROUND OF THE INVENTION

The present invention is directed to the field of power driven wheelchairs, in general, and more particularly, to a method and apparatus for setting speed/response performance parameters thereof to the operational capabilities of an individual user.

Power driven wheelchairs which may be of the type manufactured by Invacare Corporation of Elyria, Ohio, for example, generally include right and left side drive wheels driven by a motor controller via respectively corresponding right and left side drive motors, all of which being disposed on the wheelchair. An exemplary illustration of such a motor drive arrangement is shown in the schematic of FIG. 1. Referring to FIG. 1, a motor drive controller 10 which may be an Invacare Mk VI™ controller, for example, controls drive motors 12 and 14 which are mechanically linked respectively to the right side and left side drive wheels of the wheelchair. A user interface 16 which may include a joystick 18 and selection switches (not shown) operable by a user is also disposed on the wheelchair in a convenient location to the user. The user interface 16 is generally interfaced to the controller 10 over a two wire serial coupling 20 to permit the user to select a drive program appropriate for operating the wheelchair in its environment and to adjust the direction and speed of the wheelchair within the selected drive program. The controller 10 may be programmed with a plurality of drive programs, each suited for a particular operating environment.

The motor controller 10 is generally powered by a battery source 22, which may be 24 volts, for example, also disposed on the wheelchair. The drive motors 12 and 14 may be of the permanent magnet type and may be either a gearless, brushless AC motor or a brush type DC motor. The controller 10 may include a microcontroller interfaced and responsive to the user interface 16 to control drive signals 24 and 26 to motors 12 and 14, respectively, via a power switching arrangement configured in accordance with the motor type being driven. The power switching arrangement may be powered by the 24V battery 22. Thus, as the user adjusts the speed and direction of the wheelchair via the joystick of interface 16, appropriate drive signals 24 and 26 are controlled by controller 10 to drive the motors 12 and 14 accordingly. Controller 10 generally controls motor speed to the user setting in a closed loop manner.

Actual speed of each motor 12 and 14 is derived from signals 28 and 30 respectively sensed therefrom. For example, for AC motors, a Hall Effect sensor may be disposed at the motor for sensing and generating a signal representative of angular position. The controller 10 may derive motor speed from a change in angular position for use as the actual speed feedback signal for the closed loop speed control of the motor. For DC motors, the voltage Va across the armature and armature current Ia may be sensed from each motor 12 and 14 and provided to the controller 10 via lines 28 and 30, respectively. Controller 10 may in turn derive the actual speed of each motor 12 and 14 from the respective voltage Va and current Ia measurements thereof for use as the speed feedback signal for the respective closed loop speed control of each motor 12 and 14.

For safety purposes, certain performance parameters of the wheelchair which may include, but not be limited to, forward speed, turning speed, reverse speed, response, forward acceleration, turning acceleration, turning deceleration, torque and braking (forward and reverse deceleration), for example, are preset during manufacture and stored in a non-volatile memory 32, which may be an electrically erasable programmable read only memory (EEPROM), for example. The motor controller 10 is constrained in its control of the drive motors by these performance parameters. However, these factory preset performance parameters are established for an average user and are not meant to satisfy the safety needs and operating capabilities of all users. So, the wheelchair manufacturer stores the average performance parameters in a non-volatile memory which is alterable in the field, like the EEPROM.

When a power driven wheelchair is sold to a user at a dealership, for example, before the user may be allowed to operate the wheelchair unattended, a trained medical health adviser works with the user to determine safe performance parameters for the user based on the user's cognitive response and physical limitations, like tremors, arthritis, . . . etc. Currently, each of the aforementioned performance parameters is individually determined to satisfy each user's needs. Once determined, each of the new performance parameters is entered into the non-volatile memory 32 of the controller 10 through a remote programmer 34 which may be electrically coupled to a port of the microcontroller of controller 10 via signal lines 36, for example, thus, rendering the wheelchair unique to the user's safe operating capabilities. Each dealer is generally provided with one or more remote programmers. Each remote programmer 34 may include a screen 38 for displaying interactive text and graphics and a plurality of pushbuttons 40 for communicating with the microcontroller which is programmed to interact with the programmer 34 and EEPROM 32 as will become more evident from the description found herein below.

Determining each safe performance parameter for a user may require an iterative procedure. That is, a user may first operate the wheelchair with a preset performance parameter, like forward speed, for example, under the observation of the medical adviser. If the user operation is found unacceptable, then a new parameter setting is entered into the controller via the programmer and the user operates the wheelchair with the newly entered parameter. From the observations, the medical adviser may readjust the parameter setting to better suit the user's operating capabilities and the procedure is repeated until the medical adviser is satisfied that the parameter setting is safely within the user's operational capabilities. This iterative procedure will continue individually for each performance parameter for a drive program and the process is repeated for each drive program of the controller.

Understandably, the determination of the individual performance parameters currently performed is a very timely and costly operation which needs improvement. The present invention is intended to address the timeliness and cost of the current parameter setting technique and provide a method and apparatus which overcomes the drawbacks thereof.

SUMMARY OF THE INVENTION

In accordance with one aspect of the present invention, a method of setting values of a multiplicity of performance parameters of a power driven wheelchair into a controller thereof for use by the controller in the operation of the wheelchair by a user comprises the steps of: grouping the multiplicity of performance parameters of the wheelchair into at least two groups, each group including more than one performance parameter; for each group, (a) establishing a corresponding relationship between a selected performance parameter of the group and each of the other performance parameters of the group; and (b) presetting the established relationships into the controller of the wheelchair; determining a value for the selected performance parameter of each group based on the user's capabilities of operating the wheelchair; entering the determined value for the selected performance parameter of each group into the controller, deriving automatically by the controller for each group a value for each of the other performance parameters of the group based on the entered value of the selected performance parameter of the group and the corresponding established relationships of each of the other performance parameters with the selected performance parameter of the group; and storing the entered and derived values of the performance parameters into the controller for use thereby in the operation of the wheelchair by the user.

In accordance with another aspect of the present invention, apparatus for setting values of a multiplicity of performance parameters of a power driven wheelchair for use in the operation of the wheelchair by a user comprises: a microcontroller; a memory coupled to the microcontroller for storing parameter values of at least two groupings of the multiplicity of performance parameters of the wheelchair, each grouping including more than one performance parameter and including a selected performance parameter, the memory storing for each group pre-established relationships between the selected performance parameter of the group and each of the other performance parameters of the group; a remote programmer unit interfaceable to the microcontroller for use in entering a value for the selected performance parameter of each group, the microcontroller responsive to the remote programmer for deriving automatically for each group a value for each of the other performance parameters of the group using the entered value of the selected performance parameter of the group and the stored corresponding established relationships of each of the other performance parameters with the selected performance parameter of the group; and an alterable non-volatile memory coupled to the microcontroller, the microcontroller operative to store the entered and derived values of the performance parameters into the non-volatile memory for use in the operation of the wheelchair by the user.

BRIEF DESCRIPTION OF THE DRAWINGS

FIG. 2 is a table of exemplary empirically determined values for a first group of performance parameters at predetermined speed settings.

FIG. 3 is a table of exemplary empirically determined values for a second group of performance parameters at predetermined response settings.

DETAILED DESCRIPTION OF THE INVENTION

Figure 1:
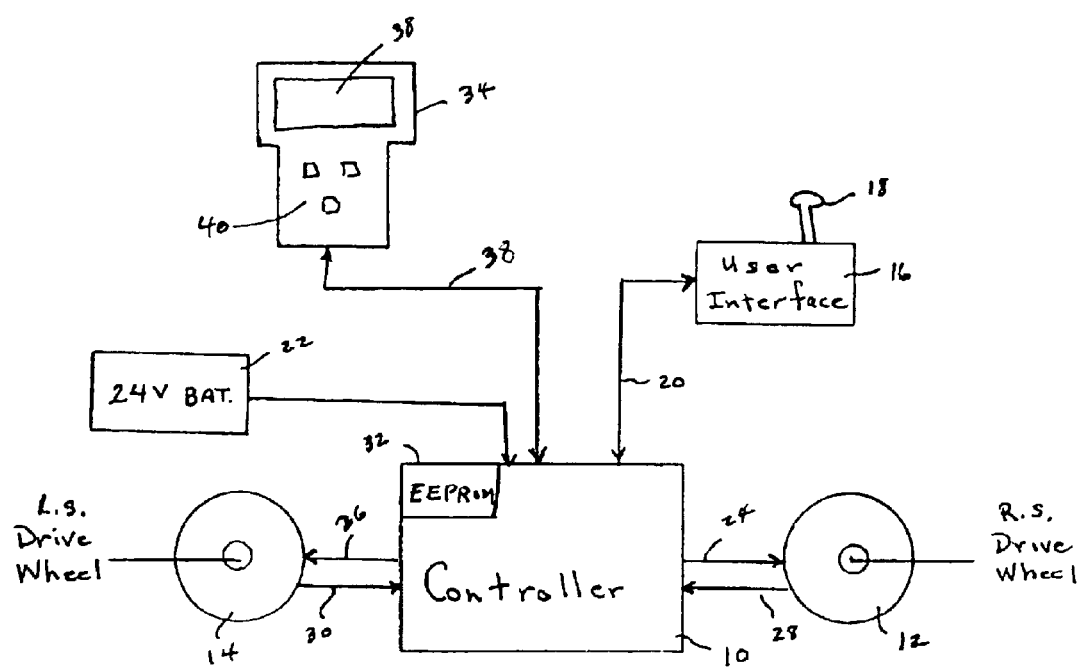
FIG. 1 is a block diagram schematic illustration of an exemplary motor drive arrangement for a wheelchair.

In accordance with the present invention, a multiplicity of performance parameters of a power driven wheelchair are grouped into at least two groups, each group including more than one performance parameter. The multiplicity of performance parameters may include, but not be limited to, forward speed, turning speed, reverse speed, response, forward acceleration, turn acceleration, turn deceleration, torque and braking (forward and reverse deceleration), for example. As indicated above, values of these parameters are established for an average user and may be preset during manufacture and stored in the non-volatile memory 32, which may be an electrically erasable programmable read only memory (EEPROM), for example. For the present embodiment, each of these preset stored settings are given a label as follows: forward speed=Speed_0, turn speed=Turn Speed_0, reverse speed=Reverse Speed_0, response=Response_0, forward acceleration=Acceleration_0, turn acceleration=Turn Accel_0, udeceleration=Turn Decel_0, braking=Braking_0, and torque=Torque_0.

In the present embodiment, the multiplicity of performance parameters are grouped into first and second groups, wherein the first group comprises: speed, forward speed, turning speed and reverse speed, and the second group comprises: response, forward acceleration, turning acceleration, turning deceleration, torque, and braking. While the speed and acceleration performance parameters need no explanation, other performance parameters of the multiplicity may not be as well understood. For example, the response parameter controls the responsiveness or quickness of the wheelchair to changes in drive commands; the torque parameter controls the stiffness and tracking ability of the wheelchair to joystick commands; and the braking parameter controls the response time to slow or stop the wheelchair. A parameter is selected for each group: For example, the forward speed parameter is selected for the first group and referred to as simple "Speed", and the response parameter is selected for the second group and referred to as simply "Response".

Then, for each group, corresponding relationships between the selected performance parameter of the group and each of the other performance parameters of the group are respectively established. These relationships may be established by having a trained wheelchair medical professional take empirical data of the parameters of each group through various settings. Examples of such empirical data for the first group are shown in the table of FIG. 2. The values shown in the table of FIG. 2 for forward speed and turning speed represent a percentage of the fastest allowable forward speed of the wheelchair which is considered the 100% value. The fastest allowable speed is defined as the highest speed attained when the joystick is displaced to its maximum. Note that maximum turning speed for the present embodiment is 60%. On the other hand, the values shown for reverse speed represent a percentage of the fastest allowable speed in reverse which is considered 100%. For example, going across row 1 from left to right, the forward speed value 95 and turning speed value 20 represents 95% and 20% of the fastest allowable forward speed, and the reverse speed value 35 represents 35% of the fastest reverse speed allowable.

Similarly, examples of empirical data taken for the second group are shown in the table of FIG. 3. In the table of FIG. 3, the rows going from top to bottom represent values corresponding to response settings of 100%, 75%, 50%, 25%, and 0%, respectively. Also, the data values for forward acceleration represent a percentage of the quickest allowable acceleration for the wheelchair, i.e. the quickest time it takes to reach the maximum allowable speed, which is considered 100%. The data values for turn acceleration and deceleration represent a percentage of the quickest allowable response to turn commands which is considered 100%. The data values for torque represent a percentage of the maximum allowable stiffness of chair response which is considered 100%. Note that 0% torque represents the maximum allowable softness of chair response. Finally, the data values of braking represent a percentage of the maximum allowable braking capability of the wheelchair system which is considered 100%.

Turning speed may be considered a part of the second group as well and form a relationship with the selected response parameter. However, in the case of turning speed, it is first set according to the relationship with forward speed and that value, which is represented by an "X" in the table of FIG. 3, is adjusted in relation to the response setting. For example, at a response setting of 50%, the turning speed is adjusted to its present setting or 1.0 X.

The relationships between the selected parameter and the other parameters of each group established by empirically taken data may be stored in the non-volatile memory 32 of the controller 10 in the form of look-up tables similar to those shown in FIGS. 2 and 3, for example. More rows may be established by taking more data. Values for the other parameters of the group related to a Speed setting in between the values of the table of FIG. 2 may be determined by extrapolation techniques, for example. That is, if the Speed is set at 70 which is between 75 and 55, then the value of turning speed is extrapolated to be $15+[(70-55)/(75-55)] \times (17-15)$, which is $15+(\frac{3}{4})\times 2$ or 16.5. Like wise, the value of reverse speed becomes $25+(\frac{3}{4})\times 5$ or 28.75. Values for the other parameters of the group related to a Response setting in between the values of the table of FIG. 3 may be also determined by extrapolation techniques, for example. That is, if the Response setting is 60 between 50 and 75, then each of the other parameters of the table of FIG. 3 may be determined in the same manner as described above for the "in between" Speed value using extrapolation techniques.

Alternatively, instead of look-up tables being stored in the controller memory, certain mathematical relationships may be established from the empirical data taken for each group. For example, if the exemplary data of the table of FIG. 2 is plotted with respect to the forward speed data ("Speed"), linear relationships may be established as follows:

$$\text{Forward speed} = \text{Speed}, \quad (1)$$

$$\text{Turning speed} = \text{Turn Speed}\_0 \times (\text{Speed}/\text{Speed}\_0), \text{ (subject to min. value of 2\% and max. value of 60\%)} \quad (2)$$

$$\text{Reverse speed} = \text{Reverse}\_0 \times (\text{Speed}/\text{Speed}\_0), \text{ (subject to min. value of 2\% and max. value of 100\%)}, \quad (3)$$

where Speed_0, Turn Speed_0, and Reverse_0 are the preset values stored in the EEPROM.

Likewise, if the exemplary data of the table of FIG. 3 is plotted with respect to the response data ("Response"), linear and piecewise linear relationships may be established as follows:

$$\text{Acceleration} = \text{Acceleration}\_0 + 0.1 \times (\text{Response} - \text{Response}\_0), \text{ for Response} < 50\%, \text{ or} \quad (4)$$

$$\text{Acceleration}\_0 + 0.33 \times (\text{Response} - \text{Response}\_0), \text{ for Response} => 50\%, \text{ (subject to a min. value of 0\% and a max. value of 100\%)},$$

$$\text{Turn Accel} = \text{Turn Accel}\_0 + 0.233 \,(\text{Response} - \text{Response}\_0), \text{ (subject to a min. value of 0\% and a max. value of 100\%)}, \quad (5)$$

$$\text{Turn Decel} = \text{Turn Decel}\_0 + 0.2 \times (\text{Response} - \text{Response}\_0), \text{ (subject to a min. value of 0\% and a max. value of 100\%)}, \quad (6)$$

$$\text{Braking} = \text{Braking}\_0 + 0.2 \times (\text{Response} - \text{Response}\_0), \text{ (subject to a min. value of 0\% and a max. value of 100\%)}, \quad (7)$$

$$\text{Torque} = \text{Torque}\_0 + 0.1 \times (\text{Response} - \text{Response}\_0), \text{ for Response} < 50\%, \text{ or}$$

$$\text{Torque}\_0 + 0.33 \times (\text{Response} - \text{Response}\_0), \text{ for Response} => 50\%, \text{ (subject to a min. value of 0\% and a max. value of 100\%)},$$

$$\text{Turn speed} = \text{Turn Speed}\_0 + 0.12 \times (\text{Response} - \text{Response}\_0), \text{ (subject to a min. value of 2\% and a max. value of 100\%)},$$

where Response_0, Acceleration_0, Turn Accel_0, Turn Decel_0, Braking_0, Torque_0, and Turn Speed_0 are the stored preset values in the EEPROM.

Then, as each wheelchair leaves the factory, it will have the preset values of the multiplicity of performance parameters determined for an average user and the foregoing described relationships between the selected parameter and other parameters of each of at least two groups stored in the non-volatile memory of the controller thereof. So, at the dealership, for example, as each such wheelchair is sold to a user, only the selected parameter of each group need be determined in accordance with the unique operational capabilities of the user. In the present embodiment, the multiplicity of performance parameters are grouped into two groups and the selected parameter for the first group is Speed and for the second group is Response. Thus, for the present embodiment, only the values of Speed and Response are determined uniquely to the user based on the user's capabilities of operating the wheelchair and the other parameters of each group are derived automatically by the controller from the Speed and Response values which are entered into the controller once determined as will become more evident from the following description.

Once the Speed and Response values are determined uniquely to the user of the wheelchair, they are entered into the controller 10, preferably using the remote programmer 34. The block diagram schematic of FIG. 4 illustrates suitable apparatus for embodying the principles of the present invention. Referring to FIG. 4, the remote programmer 34 comprises the screen 38 which may be a liquid crystal display (LCD), for example, and a plurality of pushbuttons 40 for use in entering the determined Speed and Response values by interacting with the image on the screen 38. More specifically, the pushbuttons 40 may include a Power I/O (P), Save (Sa), Menu (M), Select (Se), up (↑) and down (↓) pushbuttons.

In the present embodiment, the remote programmer 34 communicates with the controller 10 via serially coded signals over lines 42. The controller 10 may include a programmed microcontroller 44 which may be of the type manufactured by Motorola bearing model no. MC9S12A128, for example. The serial lines 42 may be coupled to the microcontroller 44 through a serial communication controller 46 which may be of the type licensed by Echelon Corporation and manufactured by Toshiba bearing model no. TMPN3150, for example. The tasks of the Echelon controller 46 include setting the protocol, performing serial/parallel translations, checking for errors in transmission, and managing the traffic for the serial communication between the remote controller 34 and microcontroller 44.

The microcontroller 44 may include an internal memory 48 which may be of the random access (RAM) or scratch pad type, for example, and is coupled to the EEPROM 32 over address (A), data (D) and control (C) lines. While the memory 48 is shown internal to the microcontroller 44, it is understood that a portion or all of the memory 48 may be just as well external to the microcontroller 44. Generally, when powered up, the controller 44 will boot up under program control and may access the preset parameters and relationships stored in the EEPROM 32 and store them temporarily to the scratch pad memory 48 for interaction with the remote programmer 34 and operation of the wheelchair. It is understood that when power is removed, the stored data of the RAM 48 will be lost. Only, the EEPROM will retain the data of its memory without power.

Figure 5A:
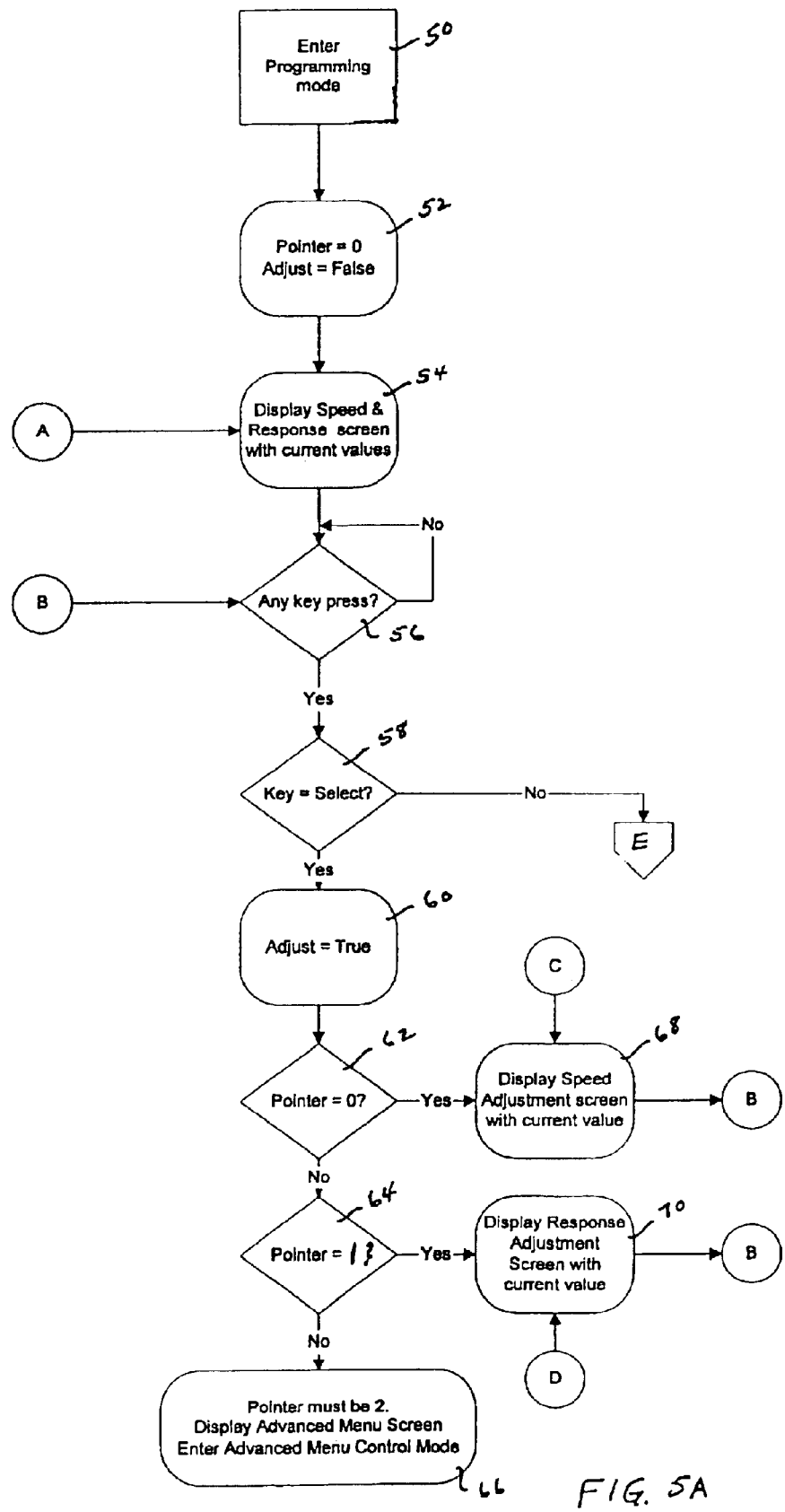
FIGS. 5A and 5B are flowcharts of an exemplary program executable by the apparatus of FIG. 4 for carrying out an aspect of the present invention.
Figure 5B:
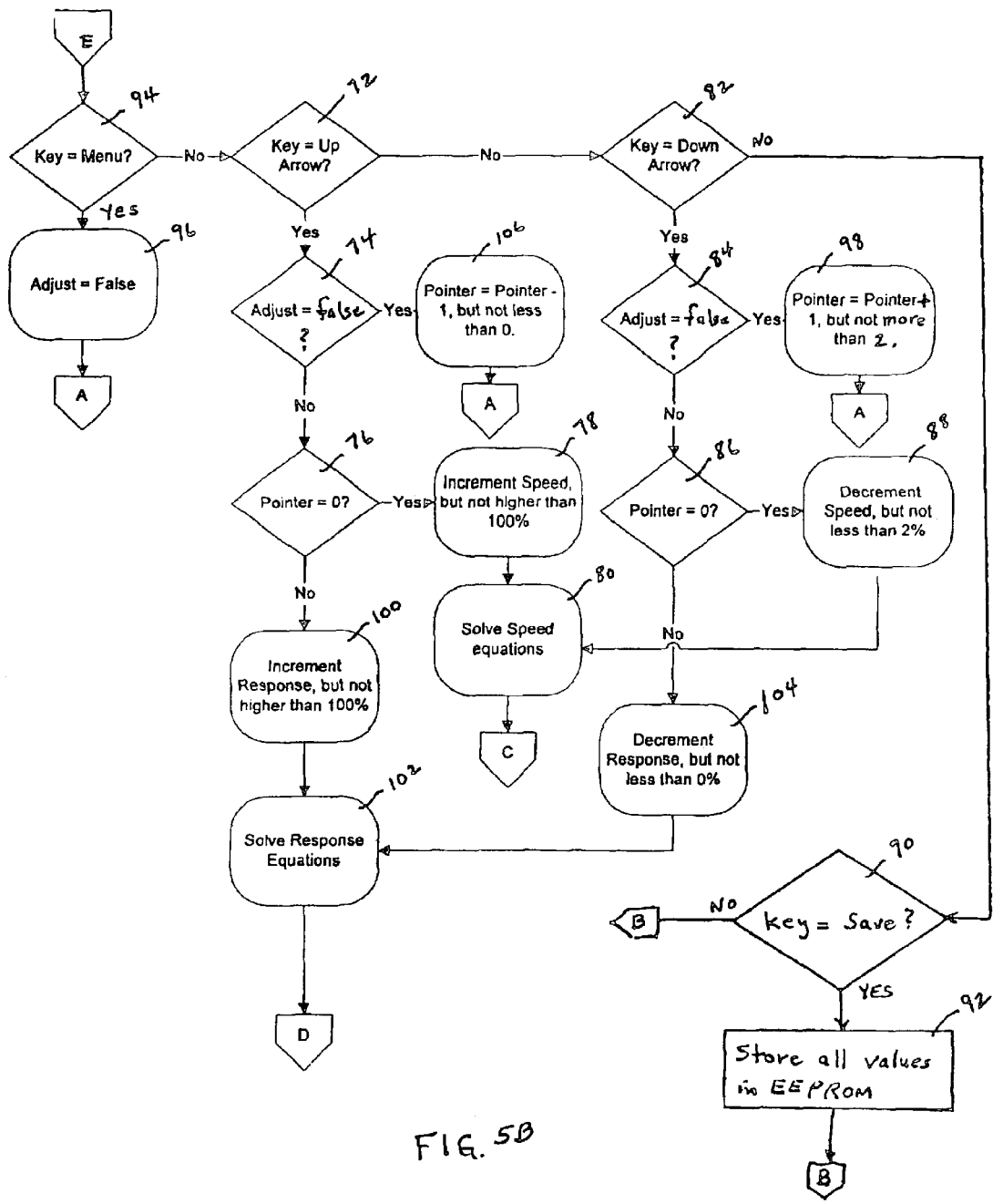

As indicated above, the microcontroller 34 is programmed to interact with the remote controller 34 via signal lines 42 and communication controller 46 for entry of the Speed and Response values or settings and for the derivation of the other performance parameters using the stored established relationships. The flowchart of FIGS. 5A and 5B exemplifies a program for execution by the microcontroller 44 for performing the aforementioned tasks. Referring to FIGS. 5A and 5B, in block 50, the microcontroller 44 responds to the activation (depression) of the P pushbutton of the remote controller 34 by entering the program or parameter setting mode. In the next block 52, the microcontroller sets a pointer to value 0 and an adjust flag to false as will become more evident from the description below. Then, in block 54 an initial screen menu image is transmitted to the programmer 34 for display on the LCD screen 38 thereof.

Figure 4A:
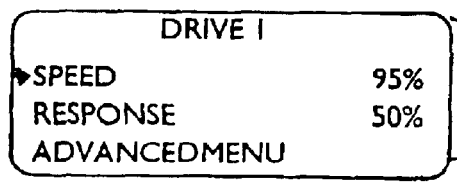
FIGS. 4A, 4B and 4C are exemplary screen image displays for use in the operation of the apparatus of FIG. 4.
Figure 4:
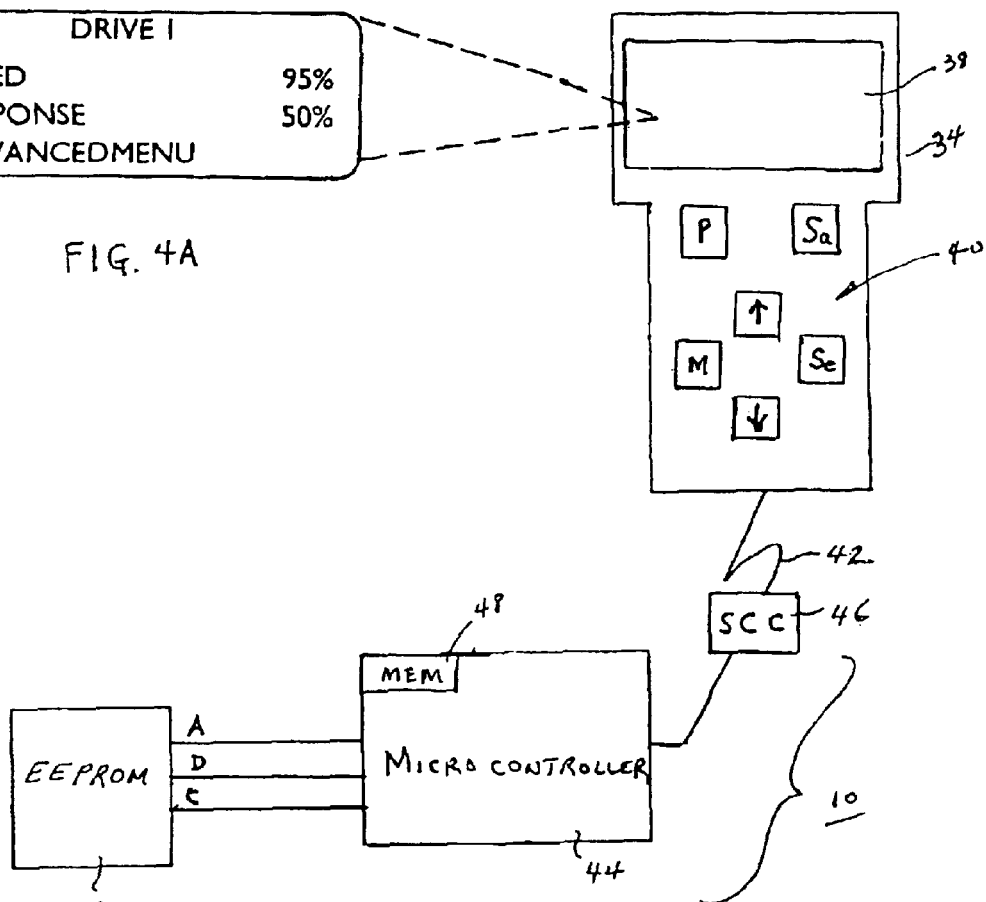
FIG. 4 is an illustration of apparatus suitable for embodying an aspect of the present invention.

An exemplary menu image display is shown in FIG. 4A. Note that the initial Speed and Response parameter entry is programmed for Drive 1 which is displayed at the middle top of the screen image. Also shown in the exemplary image of FIG. 4A are three lines of text. The top and middle lines of the three respectively include the word "SPEED" followed by the preset value thereof and the word "RESPONSE" followed by the preset value thereof, both values being accessed from the EEPROM 32 as described herein above. The bottom line of the three includes the text "ADVANCED MENU". The selection of each line of text is performed by the movement of an arrow pointer shown to the left of the image. Each line position of the pointer is correlated in the microcontroller program with a number. For example, the number 0 represents the first line or SPEED pointer position, the number 1 represents the second line or RESPONSE pointer position, and the number 2 represents the third line pointer position. Since the pointer was set to 0 in block 52, a pointer image will appear adjacent to the text "SPEED" in line 1 as shown in FIG. 4A.

Referring back to FIG. 5A, the controller waits for any of the pushbuttons (keys) 40 to be pressed in the decision block 56. Note that the decision block 56 will continue to loop upon itself until one of the keys 40 is pressed. If the P key is pressed, then program execution will discontinue until the P key is once again depressed and then start back at block 50. If the Se key is depressed as determined by decision block, then program execution continues at block 60 in which the adjust flag is set true. Next, the pointer position is established by blocks 62, 64 and 66. If the pointer is set at 0 as determined by block 62, program execution continues at block 68; if the pointer is set at 1 as determined by block 64, program execution continues at block 70; otherwise program execution continues at block 66 which will be described in greater detail herein below.

Figure 4B:
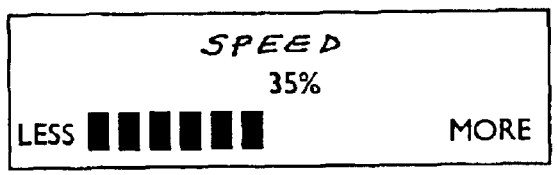

At block 68, the microcontroller 44 transmits a display screen image for speed adjustment to the programmer 34 for display on the LCD 38. An exemplary speed adjust screen display is shown in FIG. 4B. Note that the current value of the SPEED parameter accessed from the EEPROM is initially displayed. In the image of FIG. 4B, an adjustment graphic in the form of a thermometer is displayed increasing from left to right, i.e. blocks are filled in from left to right as the SPEED parameter is adjusted up and vice versa. In this state, program execution continues at block 56 waiting for either an ↑ or ↓ key depression. If the ↑ key is pressed, program execution continues at block 72 in FIG. 5B. Since the adjust flag is set true and pointer is set to 0, blocks 74 and 76 divert program execution to block 78 wherein SPEED parameter is incremented in predetermined increments, which may be at approximately 1% increments, for example. In the present embodiment, the SPEED parameter may not exceed 100%. As the SPEED parameter is adjusted upward in block 78, the first group parameters of forward speed, turning speed and reverse speed are automatically derived by the microcontroller 44 in block 80 according to the respectively associated stored relationships, like the respective relationships of equations (1), (2), and (3) described above, for example.

Likewise, if the ↓ key is pressed in this state, program execution continues at block 82 in FIG. 5B. Since adjust is set true and pointer is set to 0, blocks 84 and 86 divert program execution to block 88 wherein SPEED parameter is decremented in predetermined decrements, which may be at approximately 1% decrements, for example. In the present embodiment, the SPEED parameter may not be adjusted below 2%. As the SPEED parameter is adjusted downward in block 88, the first group parameters of forward speed, turning speed and reverse speed are automatically derived by the microcontroller 44 in block 80 as previously described herein above. When the ↑ or ↓ key is released, program execution continues at block 56 via block 68 wherein the program waits for a key to be pressed.

If the programmer has completed the entry of the determined value of the SPEED parameter into the microcontroller, then the Sa key is pressed as determined by decision block 90 and program execution is diverted to block 92 wherein the entered and derived values of the parameters of the first group are stored in appropriate storage locations of the EEPROM 32 by the microcontroller 44. Thereafter, the program execution is returned to block 56. If the programmer desires to return to menu image of FIG. 4A, the M key maybe depressed which is detected by block 94. Upon detection of the M key depression, the adjust flag is set false in block 96 and the menu image is displayed on the screen 38 of the programmer 34 by the microcontroller 44. In the menu image, the current value of SPEED is displayed numerically.

Figure 4C:
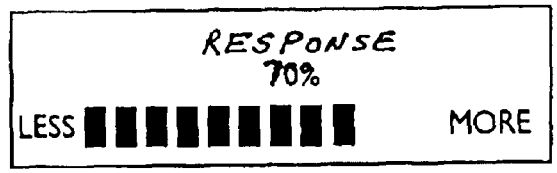

In the present state with the menu image displayed, the programmer may depress the ↓ key to move the pointer to the RESPONSE parameter which is detected by decision block 82. With the adjust flag set false, program execution is diverted by block 84 to block 98 wherein the pointer position is incremented by 1, but not more than 2. When the pointer is incremented to 1, the pointer image on the screen 38 is moved by the microcontroller 44 adjacent RESPONSE so that when the Se key is depressed, a response adjustment image will be displayed on the screen 38 by the block 70. An exemplary RESPONSE parameter adjustment image is shown in FIG. 4C and includes a similar thermometer type graphic image as displayed for the SPEED parameter adjustment screen of FIG. 4B. Also, when the Se key is pressed, the adjust flag is set true in block 60.

In the RESPONSE adjustment state, adjustment may be accomplished by depressing the ↑ and ↓ keys. An ↑ key depression is detected by block 72 in FIG. 5B. Since adjust is set true and pointer is set to 1, blocks 74 and 76 divert program execution to block 100 wherein the RESPONSE parameter is incremented in predetermined increments, which may be at approximately 1% increments, for example.

In the present embodiment, the RESPONSE parameter may not exceed 100%. As the RESPONSE parameter is adjusted upward in block 100, the second group parameters of forward acceleration, turn acceleration, turn deceleration, braking, torque and perhaps, turn speed are automatically derived by the microcontroller 44 in block 102 according to the respectively associated stored relationships, like the respective relationships of equations (4) through (9) described above, for example.

Likewise, an ↓ key depression in this state is detected by block 82 in FIG. 5B. Since adjust is set true and pointer is set to 1, blocks 84 and 86 divert program execution to block 104 wherein the RESPONSE parameter is decremented in predetermined decrements, which may be at approximately 1% decrements, for example. In the present embodiment, the RESPONSE parameter may not be adjusted below 0%. As the RESPONSE parameter is adjusted downward in block 104, the second group parameters are automatically derived by the microcontroller 44 in block 102 as previously described herein above. When the ↑ or ↓ key is released, program execution continues at block 56 via block 70 wherein the program waits for a key to be pressed.

If the programmer has completed the entry of the determined value of the RESPONSE parameter into the microcontroller, then the Sa key is pressed as determined by decision block 90 and program execution is diverted to block 92 wherein the entered and derived values of the parameters of the second group are stored in appropriate storage locations of the EEPROM 32 by the microcontroller 44. Thereafter, the program execution is returned to block 56. If the programmer desires to return to menu image of FIG. 4A, the M key maybe depressed which is detected by block 94. Upon detection of the M key depression, the adjust flag is set false in block 96 and the menu image is displayed on the screen 38 of the programmer 34 by the microcontroller 44. In the menu image, the current values of SPEED and RESPONSE are displayed numerically.

If the programmer wants to return to the SPEED adjustment, the ↑ key is depressed which is detected by blocks 56 and 72. With the adjust flag set false, block 74 diverts program execution to block 106 wherein the pointer is decremented by 1 to 0. The microcontroller 44 responds to a pointer setting of 0 by causing the pointer image to move adjacent SPEED in the menu image of screen 38. The programmer may also advance to the ADVANCED MENU setting by depressing the appropriate keys to increment the pointer to a setting of 2. In this state, the program enters the advance menu control mode of microcontroller 44 via execution of block 66 to permit the programmer to enter values for the multiplicity of parameters individually through a series of different screen images.

After the performance parameters are entered and derived for the first and second groups for the Drive 1 program, the P key is depressed to exit the program. Then, the medical advisor observes the user operation and may make further modifications to the speed and response parameters. When satisfactory user operation is achieved for a drive program setting, the next consecutive drive program, like Drive 2, for example, may be selected utilizing the user interface 16 and conveyed to the controller 10 via the serial coupling 20 (see FIG. 1). The medical advisor then observes the user operation in this drive program and determines if the speed and response parameters should be changed. When the P key is pressed again, the program is again entered but at this next consecutive drive program which may be Drive 2, for example. The foregoing described process may be repeated for entering and deriving the user performance parameters for the groups of the Drive 2 program. In this manner, the performance parameters unique to the user of the wheelchair may be entered and derived accordingly for each of the programs of the wheelchair and used in the operation thereof by the user. Note that according to the inventive process, only a selected parameter of each group need be determined uniquely for the user for each drive program and the other parameters of the each group derived automatically in the controller according to the previously established relationships stored in the memory of the controller. This improvement represents a substantial savings in time and money over the process heretofore practiced.

While the present invention has been presented above in connection with one or more embodiments, it is understood that the use of such embodiments to describe the invention is solely by of example. Accordingly, the present invention should not be limited in any way by such embodiments, but rather construed in breadth and broad the recitation of the claims appended hereto.

What is claimed is:

1. A method of setting values of a multiplicity of performance parameters of a power driven wheelchair into a controller thereof for use by said controller in the operation of said wheelchair by a user, said method comprising the steps of:

grouping the multiplicity of performance parameters of said wheelchair into at least two groups, each group including more than one performance parameter;

for each group,
(a) establishing a corresponding relationship between a selected performance parameter of the group and each of the other performance parameters of the group; and
(b) presetting said established relationships into the controller of said wheelchair;

determining a value for the selected performance parameter of each group based on the user's capabilities of operating said wheelchair;

entering said determined value for the selected performance parameter of each group into the controller;

deriving automatically by the controller for each group a value for each of the other performance parameters of the group based on the entered value of the selected performance parameter of the group and the corresponding established relationships of each of the other performance parameters with the selected performance parameter of the group; and storing the entered and derived values of the performance parameters into the controller for use thereby in the operation of said wheelchair by the user.

2. The method of claim 1 wherein the step of grouping includes grouping the multiplicity of performance parameters into first and second groups; and wherein forward speed is the selected parameter of the first group and response is the selected parameter of the second group.

3. The method of claim 2 wherein the performance parameters comprising forward speed, turning speed and reverse speed are grouped into the first group; and wherein the performance parameters comprising response, forward acceleration, turning acceleration, turning deceleration, torque and braking are grouped into the second group.

4. The method of claim 3 wherein the step of establishing for the first group includes: establishing a first linear relationship between forward speed and turning speed, and establishing a second linear relationship between forward speed and reverse speed.

5. The method of claim 3 wherein the step of establishing for the second group includes establishing the following relationships: first and second piecewise linear relationships between response and forward acceleration, a third linear relationship between response and turning acceleration, a fourth linear relationship between response and turning deceleration, a fifth linear relationship between response and braking, and sixth and seventh piecewise linear relationships between response and torque.

6. The method of claim 1 including the step of presetting the controller with initial performance parameter values; and wherein the step of establishing includes establishing each corresponding relationship between the selected performance parameter of the group and each of the other performance parameters of the group using the preset initial performance parameter values corresponding to each parameter of the relationship.

7. The method of claim 1 wherein the step (b) of presetting includes programming the established relationships into a microcontroller of the controller of the wheelchair.

8. The method of claim 7 wherein the step of entering includes entering the determined value for the selected performance parameter of each group into a memory of the microcontroller through a remote programmer unit interfaceable to the microcontroller.

9. The method of claim 8 wherein the other performance parameters of each group are derived automatically by the microcontroller based on the entered value of the corresponding selected performance parameter.

10. The method of claim 9 wherein the entered and derived values of the performance parameters are stored in a non-volatile memory by the microcontroller for use by the microcontroller in the operation of the wheelchair by the user.

11. Apparatus for setting values of a multiplicity of performance parameters of a power driven wheelchair for use in the operation of said wheelchair by a user, said apparatus comprising:

a microcontroller;

a memory coupled to said microcontroller for storing parameter values of at least two groupings of the multiplicity of performance parameters of said wheelchair, each grouping including more than one performance parameter and including a selected performance parameter, said memory storing for each group pre-established relationships between the selected performance parameter of the group and each of the other performance parameters of the group;

a remote programmer unit interfaceable to the microcontroller for use in entering a value for the selected performance parameter of each group, said microcontroller responsive to the remote programmer for deriving automatically for each group a value for each of the other performance parameters of the group using the entered value of the selected performance parameter of the group and the stored corresponding established relationships of each of the other performance parameters with the selected performance parameter of the group; and an alterable non-volatile memory coupled to the microcontroller, said microcontroller operative to store the entered and derived values of the performance parameters into the non-volatile memory for use in the operation of the wheelchair by the user.

12. The apparatus of claim 11 wherein the memory stores a first group of performance parameters comprising forward speed, turning speed and reverse speed, forward speed being the selected parameter of the first group; and wherein the memory stores a second group of performance parameters comprising response, forward acceleration, turning acceleration, turning deceleration, torque and braking, response being the selected parameter of the second group.

13. The apparatus of claim 12 wherein the memory stores for the first group a first linear relationship between forward speed and turning speed, and a second linear relationship between forward speed and reverse speed.

14. The apparatus of claim 12 wherein the memory stores for the second group the following relationships: first and second piecewise linear relationships between response and forward acceleration, a third linear relationship between response and turning acceleration, a fourth linear relationship between response and turning deceleration, a fifth linear relationship between response and braking, and sixth and seventh piecewise linear relationships between response and torque.

15. The apparatus of claim 11 wherein the non-volatile memory is preset with initial values for the multiplicity of performance parameter; and wherein the microcontroller is responsive to the remote programmer for adjusting the initial selected performance parameter values to respective determined values.

16. The apparatus of claim 15 wherein the memory stores for each group each corresponding relationship between the selected performance parameter of the group and each of the other performance parameters of the group using the initial performance parameter values corresponding to each parameter of the relationship.

* * * * *